United States Patent [19]

Irizarry

[11] Patent Number: 5,649,634

[45] Date of Patent: Jul. 22, 1997

[54] HOLDER FOR THIN PLANAR OBJECTS

[76] Inventor: Joseph Irizarry, HC 89 Box 51, Firehouse Rd., Pocono Pines, Pa. 18350

[21] Appl. No.: 556,575

[22] Filed: Nov. 13, 1995

[51] Int. Cl.⁶ ...................................................... A47F 7/00
[52] U.S. Cl. .......................... 211/120; 84/329; 248/205.5
[58] Field of Search ................................. 211/120, 69.8, 211/13, 45; 248/443, 302, 363, 450, 451, 205.5, 175; 84/DIG. 3, 453, 329

[56] References Cited

U.S. PATENT DOCUMENTS

| 70,500 | 11/1867 | Averell | 211/120 X |
|---|---|---|---|
| D. 174,366 | 3/1955 | Ziskind | D4/3 |
| D. 355,667 | 2/1995 | Burger | 84/329 X |
| 635,283 | 10/1899 | Adair | 211/69.8 |
| 2,182,287 | 12/1939 | Eads | 248/443 |
| 2,366,483 | 1/1945 | Bona | 211/69.8 |
| 2,482,258 | 9/1949 | Funk, Jr. et al. | 206/8 |
| 2,518,401 | 8/1950 | Thompson | 120/1 |
| 2,621,880 | 12/1952 | Wester | 248/204 |
| 2,642,603 | 6/1953 | Mills | 15/105 |
| 3,948,476 | 4/1976 | Kuniyosi | 248/443 |
| 4,890,531 | 1/1990 | Tischer | 84/329 |

FOREIGN PATENT DOCUMENTS

| 20201 | 4/1905 | Sweden | 211/120 |
|---|---|---|---|
| 576759 | 4/1946 | United Kingdom . | |

*Primary Examiner*—Robert W. Gibson, Jr.
*Attorney, Agent, or Firm*—Ohlandt, Greeley, Ruggiero & Perle

[57] ABSTRACT

There is provided a guitar pick holder adapted to be mounted to the outer surface of a guitar, which holder provides quick and easy access to the guitar pick even by a musician holding the guitar. The guitar pick holder comprises a suction cup and an elongated coil of resilient wire. The suction cup has a lower portion for attachment to the flat surface by a vacuum force, and an upper portion that is supported above the flat surface by the lower portion. The elongated coil of resilient wire is secured to the upper portion of the suction cup and has an arcuate shape such that its outer periphery is greater than its inner periphery. In addition, the elongated coil has a plurality of individual turns that form a plurality of slots for receiving the guitar pick. Thus, the present invention permits insertion and retrieval of guitar picks to and from the guitar pick holder without requiring the musician to view the guitar pick holder.

19 Claims, 1 Drawing Sheet

HOLDER FOR THIN PLANAR OBJECTS

BACKGROUND OF THE INVENTION

I. Field of the Invention

The present invention relates generally to a holder for thin planar objects, such as a guitar pick, that provides convenient access to the object. More particularly, the present invention relates to a guitar pick holder adapted to be mounted to a guitar that provides quick and easy access to the guitar pick by a musician during playing of the guitar, and easy storage as well.

II. Description of the Prior Art

Existing guitar pick holders are generally designed to keep a plurality of guitars picks in one container. Typically, such guitar pick holders include stacking mechanisms that receive and dispense guitar picks one-at-a-time. Guitar picks are placed on the stack such that the last guitar pick placed on the stack is the first guitar pick removed from the stack. To place a guitar pick on the stack, it is necessary to press down gently on the stack while sliding the guitar pick in place at the top of the stack. Likewise, to remove a guitar pick from the stack, it is necessary to press down gently and slide the guitar pick off the stack. Thus, concentration and accuracy is required for placement and removal of a guitar pick. Also, one cannot firmly grasp and control the guitar pick until it has been removed from the stack.

For convenient access to a guitar pick during playing of the guitar, it is desirable to have the guitar pick holder on the guitar. However, damage to the guitar must be avoided. Use of double-sided adhesives to attach a guitar pick holder to the front face of the guitar would damage the surface of the guitar and mar its finish. Moreover, it may affect the sound generated by the guitar.

The attachment of items to the outer surface of a stringed instrument, without damage to the surface of the instrument, are known. For example, U.S. Pat. No. 3,948,476 to S. Kuniyosi, which issued on Apr. 6, 1976, provides an adjustable bar that attaches to two sides of a guitar and supports a music stand in front of the guitar. In particular, the adjustable bar includes one pair of suction cups attached to the bottom side of the guitar and another pair of suction cups attached to the back of the guitar. The adjustable bar and music stand, however, add substantial weight to the guitar and are not convenient for holding a small item, such as a guitar pick.

Other types of suction-cup based holders for receiving planar objects, such as a guitar pick, are generally described in U.S. Pat. No. 840,618 to S. Golombek, which issued on Jan. 8, 1907, titled DISPLAY HOLDER FOR WINDOWS; U.S. Pat. No. 979,436 to J. E. Corbin, which issued on Dec. 27, 1910, titled VACUUM SUPPORTING DEVICE; U.S. Pat. No. 1,851,770 to E. B. Johnson, which issued on Mar. 29, 1932, titled CLIP; U.S. Pat. No. 2,006,843 to T. W. Russell, which issued on Jul. 2, 1935, titled CLIP; U.S. Pat. No. 2,133,020 to A. Fehrenbach, which issued on Oct. 11, 1938, titled SLIP-ON SHOWER SPRAY HOLDER; U.S. Pat. No. 2,164,318 to M. E. Graunke, which issued on Jul. 4, 1939, titled CARD HOLDER; U.S. Pat. No. 2,518,401 to W. M. Thompson, which issued on Aug. 8, 1950, titled DRAFTSMAN'S INSTRUMENT RACK; U.S. Pat. No. 2,621,880 to R. E. Wester, which issued on Dec. 16, 1952, titled LID REMOVER FOR WALL CAN OPENERS; U.S. Pat. No. 2,642,603 to H. L. Mills, which issued on Jun. 23, 1953, titled COMBINED BRUSH AND SOAP HOLDER; and British Patent No. 576,759 to K. S. Binnie titled DEVICE FOR SECURING ELECTRIC WIRE.

However, the above holders do not provide quick and easy access to a guitar pick. For example, U.S. Pat. No. 2,164,318, cited above, provides a one-piece card holder that is made of a resilient material. The holder includes a suction cup for attachment to a flat surface and a substantially circular head having a plurality of radially extending slits. Cards are inserted edgewise into the slits for support therein. However, each slit is very narrow and the slits are positioned substantially apart from each other. Thus, one must be attentive in matching an edge of each planar object to a particular slit and, then, aggressively sliding the planar object into the slit.

It is further known that planar objects may be conveniently supported within windings of a spring. For example, U.S. Pat. 2,482,258 to E. R. Funk, Jr., et al., which issued on Sep. 20, 1949, titled COIN HOLDER, provides a suction-cup based coin holder having a spring secured horizontally across and parallel to a rigid, preferably aluminum, flat plate. A suction cup is secured to the underside of the plate for attachment to a flat surface. However, the spring is linearly positioned horizontal to the flat surface and, thus, coins must be inserted to and removed from the coin holder from directly above. In addition, due to the elasticity of the suction cup, either end of the flat plate may tilt downward and contact the flat surface as a coin is inserted to or removed from the coin holder. Thus, this coin holder could not be used to hold a guitar pick since it may damage the surface and mar its finish.

Another example of a holder having a spring that supports planar objects is provided in U.S. Pat. No. 780,443 to A. J. Phillips, et al., which issued on Jan. 17, 1905, titled LETTER RACK. This patent provides a letter rack that includes a flat wooden base, an arched metal former and a wire coil or spring drawn over the arched metal former. The spring has an inner boundary that is positioned against the arched metal former and an outer boundary for receiving various objects, such as letters. The arched form of the spring causes the distance between windings to be wider at the outer boundary than at the inner boundary. Thus, the ability of the letter rack to quickly and easily receive objects is much better than the other holders described above. However, the letter holder has an arched metal former attached to a flat wooden base and, thus, cannot be used for a guitar pick holder since the rigid metal former and wooden base would damage the surface of the guitar and mar its finish and, again, may affect the guitar's sound. In addition, the letter holder does not includes any means for attaching items to the outer surface of the guitar without damaging the surface.

Other examples of holders having springs that support objects in their windings are provided in U.S. Pat. No. 806,691 to F. Merten, which issued on Dec. 5, 1905, titled TOOL RACK; U.S. Pat. No. 1,756,885 to J. V. Schafer, which issued on Apr. 29, 1930, titled CARD HOLDER; and U.S. Pat. No. 2,456,302 to L. M. Mocnik, which issued on Dec. 14, 1948, titled SUPPORTING DEVICE.

However, similar to the other U.S. patents cited above, none of the above patents describe or suggest a guitar pick holder that provides quick and easy access of a guitar pick held by the guitar pick holder and will not damage or mar the outer surface of a guitar, affect the guitar's sound or interfere with the guitar player when the guitar pick holder is mounted on the outer surface.

SUMMARY OF THE INVENTION

Against the foregoing background, it is a primary object of the present invention to provide a guitar pick holder for attachment to an outer surface of a guitar that permits quick and easy insertion and retrieval of one or more guitar picks.

It is another object of the present invention to provide such a guitar pick holder that holds a plurality of guitar picks with quick and easy access to any one of the plurality of guitar picks.

It is yet another object of the present invention to provide such a guitar pick holder in which insertion and retrieval of the guitar picks may be accomplished by a musician who is playing the guitar without necessarily viewing the guitar pick holder.

It is a further object of the present invention to provide such a guitar pick holder that easily mounts to and detaches from the outer surface of the guitar without marring the finish of the outer surface and/or leaving a residue on the outer surface.

It is still a further object of the present invention to provide such a guitar pick holder that easily mounts to the guitar and does not affect the guitar's sound or interfere with the guitar player.

To accomplish the foregoing objects and advantages, the present invention, in brief summary, is a holder for removable attachment to a flat surface that provides convenient access to an object held by the holder. The holder comprises a suction cup and an elongated coil. The suction cup has a lower portion for attachment to the flat surface by vacuum force, and an upper portion that is supported above the flat surface by the lower portion. The elongated coil of resilient wire is secured to the upper portion of the suction cup and has an arcuate shape such that an outer periphery of the elongated coil is greater than an inner periphery of the elongated coil. Also, the elongated coil has a plurality of individual turn and a plurality of slots between each individual turn with each slot adapted to receive the object.

More particularly, the holder is a guitar pick holder and the flat surface is an outer surface of a guitar. Each slot is capable of holding the guitar pick for quick and easy access, and the elongated coil is secured to the upper portion of the suction cup to avoid causing damage the outer surface of the guitar.

BRIEF DESCRIPTION OF THE DRAWINGS

The foregoing and still further the objects and advantages of the present invention will be more apparent from the following detailed explanation of the preferred embodiments of the invention in connection with the accompanying drawings.

DETAILED DESCRIPTION OF THE PREFERRED EMBODIMENTS

Figure 1:
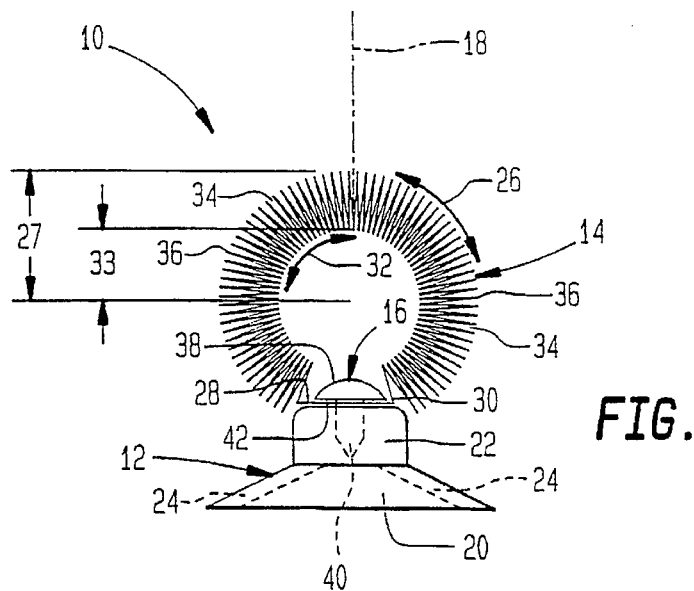
FIG. 1 is a front view of a first preferred embodiment of the present invention.

Referring to the drawings and, in particular, to FIG. 1, there is provided an object holder, specifically a guitar pick holder, of the first preferred embodiment which is generally represented by reference numeral 10. The guitar pick holder 10 comprises a suction cup 12, an elongated coil 14 of resilient wire and a screw or rivet 16 to secure the elongated coil to the suction cup. A guitar pick 18 is shown in phantom representation in FIGS. 1, 3, 4 and 5. Although the guitar pick 18 is shown at a top portion of the guitar pick holder 10, it is to be understood that the guitar pick may be positioned at any portion of the elongated coil 14 that is not already occupied by another object, such as another guitar pick. In addition, the present invention is designed for holding various types of thin planar objects and is not limited to guitar picks.

Figure 2:
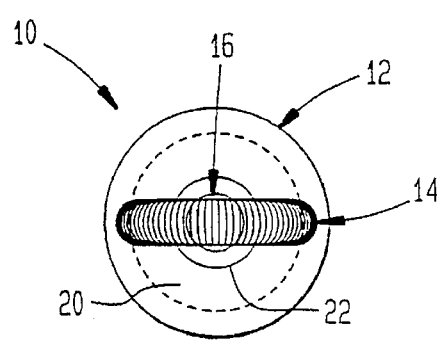
FIG. 2 is a top view of the first preferred embodiment of FIG. 1.

Referring to FIGS. 1 and 2, the suction cup 12, preferably, is a one-piece, rubber-like element that has a lower portion 20 for attachment to the flat surface, and an upper portion 22 that is supported above the flat surface by the lower portion. The lower portion 20 of the suction cup 12 has a frusto-conical shape with a flexible, thin wall 24. The upper portion 22 of the suction cup 12 is generally a solid cylinder that is, preferably, integrally attached to the top of the lower portion 20. To position the suction cup 12 on a flat surface, such as an outer surface of a guitar, the upper portion 22 of the suction cup is forced downward upon the lower portion 20 to create a vacuum force that retains the suction cup to the flat surface.

As shown in FIG. 1, the elongated coil 14, preferably, has an arcuate shape that is a substantially circular. In particular, the elongated coil 14 has the general shape of a donut with a lower section of the donut removed. The length of the elongated coil 14 along its outer periphery 26, based on an outer radius 27, must be large enough to permit the two ends 28, 30 of the elongated coil to meet at the upper portion 22 of the suction cup 12. The elongated coil 14 also has an inner periphery 32 that is smaller than the outer periphery 26, and an inner radius 33 that is less than the outer radius 27. For the first preferred embodiment, the elongated coil 14 is positioned entirely above the lower portion 20 of the suction cup 12, as shown in FIG. 2. Thus, the lower portion 20 of the suction cup 12 acts as a protective layer between the elongated coil 14 and the flat surface in the event that the elongate coil bends down toward the flat surface. In addition, the likelihood of damage to the flat surface by the elongated coil is significantly reduced.

The elongated coil 14 is made of a material that is rigid enough to hold its arcuate form above the upper portion 22 and resist the force of an incoming object, such as guitar pick 18, that is inserted into the elongated coil to avoid any damage the flat surface that supports the suction cup 12. On the other hand, the elongated coil 14 must be flexible to permit quick and easy access to the object. Thus, it is preferred the elongated coil 14 be comprised of a semi-rigid material such as metal.

The elongated coil 14, when arcuately positioned on the upper portion 22, provides a slot 34 between each pair of windings to the coil or coil portions 36. Accordingly, a plurality of slots 34 are provided for receiving the object, such as a guitar pick. Since, as described above, the outer periphery 26 of the coil 14 is greater than the inner periphery 32 and, yet, the number of windings of the coil remains constant, each slot 34 has a generally V-shaped form. For each V-shaped slot 34, the wider part or outer region of the slot is at the outer periphery 26 of the elongated coil 14 and the narrower part or inner region of the slot is at the inner periphery 32. Thus, each slot 34 is wider at the outer periphery 26 to easily catch the object and narrower at the inner periphery 32 to hold the object within the slot. Also, each coil portion 36 is positioned between a pair of slots 34 and acts to deflect an object or guitar pick into one of the pair of slots that is adjacent to that coil portion 36. In other words, an object or guitar pick that hits a coil portion 36 instead of a slot 34 will automatically deflect into an adjacent slot. Accordingly, an object or guitar pick may approach the elongated coil 14 without being directed toward a particular slot 34 since the elongated coil will guide the object into the nearest slot.

Figure 3:
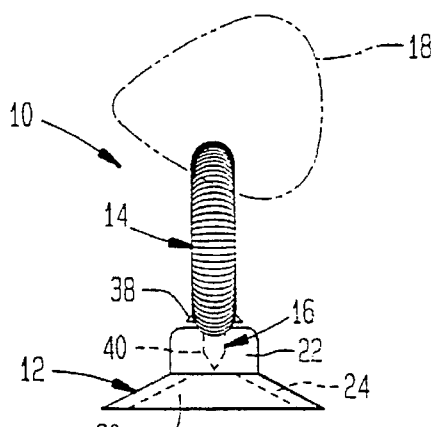
FIG. 3 is a side elevational view of the first preferred embodiment of FIG. 1.

Referring to FIGS. 1 and 3, both ends 28, 30 of the elongated coil 14 are secured to the upper portion 22 of the suction cup 12. Specifically, both ends 28, 30 are secured directly above the upper portion 22 of the suction cup 12 by conventional means, such as, for example, a rivet or, preferably, the screw 16. The screw 16 includes a head portion 38 and a body portion 40. The head portion 38 has a greater sectional diameter than the body portion 40 and, thus, creates a shoulder 42 at one end of the body portion. Thus, both ends of the elongated coil 14 are secured in place between the head portion 38 of the screw 16 and the upper portion 22 of the suction cup 12. The means for securing the elongated coil above the upper portion 22 of the section cup 12, such as the screw 16, may be removed or unscrewed to provide for easy replacement of the elongated coil 14.

Figure 4:
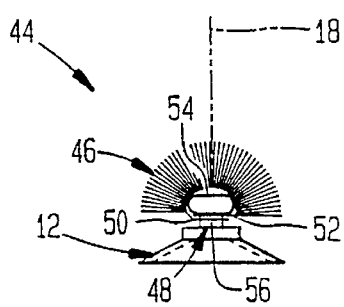
FIG. 4 is a front view of a second preferred embodiment of the present invention.
Figure 5:
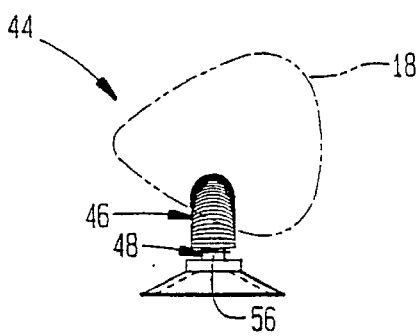
FIG. 5 is a side elevational view of the second preferred embodiment of FIG. 4.

Referring to FIGS. 4 and 5, there is shown a second preferred embodiment of the object or guitar pick holder 44. For the second preferred embodiment, the object or guitar pick holder 44 includes an elongated coil 46 and a pin 48, that are different from the elongated coil 14 and screw 16 of the first preferred embodiment. Also, the elongated coil 46 of the guitar pick holder 44 has an arcuate shape in the form of a half circle and, similar to the first preferred embodiment, the elongated coil 46 is positioned substantially above the lower portion 20 of the suction cup 12. In addition, both ends 50, 52 of the elongated coil are secured to the upper portion 22 of the suction cup 12 by pin 48 that extends from the upper portion 22 of the suction cup 12. The pin 48 includes a head portion 54 and a body portion 56 such that the head portion has a greater sectional diameter than the body portion. Similar to the screw 16 of the first preferred embodiment, it is contemplated that the body portion 56 of the pin 48 may be removed from upper portion 22 of the suction cup 12 for easy replacement of the elongated coil 46. Both ends 50, 52 of the elongated coil 46 are attached to the outer surface of the body portion 56 of the pin 48 such that the ends are between the head portion 54 of the pin 48 and the upper portion 22 of the suction cup 12. The elongated coil 46, like the coil 14 in the first embodiment, when in its arcuate or half-circle configuration, has a plurality of V-shaped slots or spaces, each adapted to removable receive the object or guitar pick.

It is contemplated that the present invention may hold a variety of planar objects, such as notes, business cards and recipe cards. In addition, the present invention may be mounted on a wide variety of non-porous surfaces, such as a refrigerator, stove, desktop or glass surface. The color and size of any embodiment of the present invention would be dictated by the type of object and surface for application of the embodiment.

The invention having been thus described with particular reference to the preferred forms thereof, it will be obvious that various changes and modifications may be made therein without departing from the spirit and scope of the invention as defined in the appended claims.

Wherefore, I claim:

1. A holder for removable attachment to a flat surface that provides convenient access to an object held by the holder, the holder comprising:

a suction cup having an upper portion and having a lower portion for attachment to the flat surface by a vacuum force and for supporting the upper portion above the flat surface; and an elongated coil of resilient wire being detachably secured to the upper portion of said suction cup and having an arcuate shape such that an outer periphery of said elongated coil is greater in length than an inner periphery of said elongated coil, said elongated coil having a plurality of individual turn that form a plurality of slots for receiving the object.

2. The holder of claim 1, wherein the outer periphery of said elongated coil is accessible from an overhead position and at least one angular position that is not directly above the outer periphery.

3. The holder of claim 1, wherein the inner periphery of said elongated coil has a radius that is less than a radius of the outer periphery.

4. The holder of claim 1, wherein each of said plurality of slots has an outer region for receiving the object and an inner region for holding the object.

5. The holder of claim 1, wherein each of said plurality of individual turns is positioned between a pair of said plurality of slots, and wherein each individual turn being capable of deflecting the object into one of said pair of slots that is adjacent to said individual turn.

6. The holder of claim 1, wherein each of said plurality slots is generally V-shaped.

7. The holder of claim 1, wherein the arcuate shape of said elongated coil is substantially circular.

8. The holder of claim 1, wherein the arcuate shape of said elongated coil forms a half circle.

9. The holder of claim 1, wherein said elongated coil has two ends that are secured directly above the upper portion of said suction cup.

10. The holder of claim 1, wherein said elongated coil has two ends that are secured to the upper portion of said suction cup.

11. The holder of claim 1, wherein said elongated coil has two ends that are secured to the upper portion of said suction cup by a screw.

12. The holder of claim 11, wherein:

said screw includes a head portion and a body portion, the head portion having a greater sectional diameter than the body portion, wherein said both ends of said elongated coil are secured between the head portion of said screw and the upper portion of said suction cup.

13. The holder of claim 11, wherein said both ends of said elongated coil are secured to the upper portion of said suction cup by a pin that extends from the upper portion of said suction cup.

14. The holder of claim 13, wherein:

said pin includes a head portion and a body portion, the head portion having a greater sectional diameter than the body portion, wherein said both ends of said elongated coil are attached to the body portion of said pin between the head portion of said pin and the upper portion of said suction cup.

15. A guitar pick holder for removable attachment to an outer surface of a guitar that provides convenient access to a guitar pick held by the holder, the holder comprising:

a suction cup having an upper portion and having a lower portion for attachment to the outer surface by a vacuum force and for supporting the upper portion above the outer surface; and an elongated coil of resilient wire being detachably secured to the upper portion of said suction cup and having an arcuate shape such that an outer periphery of said elongated coil is greater in length than an inner periphery of said elongated coil, said elongated coil having a plurality of individual turn that form a plurality of slots for receiving the guitar pick, wherein each of said plurality of slots is capable of holding the guitar pick for quick and easy access, and wherein said elongated coil is secured to the upper portion of the suction cup to avoid causing damage to the outer surface of the guitar.

16. The holder of claim 15, wherein the outer periphery of said elongated coil is accessible from an overhead position and at least one angular position that is not directly above the outer periphery.

17. The holder of claim 15, wherein the inner periphery of said elongated coil has a radius that is less than a radius of the outer periphery.

18. The holder of claim 15, wherein each of said plurality of slots has an outer region for receiving the guitar pick and an inner region for holding the guitar pick.

19. The holder of claim 15, wherein each of said plurality of individual turns is positioned between a pair of said plurality of slots, and wherein each individual turn being capable of deflecting the guitar pick into one of said pair of slots that is adjacent to said individual turn.

* * * * *